United States Patent [19]

Weber et al.

[11] Patent Number: 6,037,408

[45] Date of Patent: Mar. 14, 2000

[54] REAGENT KIT FOR THE PRODUCTION OF SYNTHETIC-RESIN ELEMENTS FOR BONDING FIXATION ELEMENTS IN PLACE IN AN ATTACHMENT SURFACE

[75] Inventors: Christian Weber, Emmendingen; Jurgen Grun, Botzingen; Elke Wasmer, Emmendingen, all of Germany

[73] Assignee: UPAT GmbH & Co., Emmendingen, Germany

[21] Appl. No.: 08/119,205

[22] Filed: Sep. 22, 1993

[30] Foreign Application Priority Data

Jul. 2, 1991 [DE] Germany .............................. 41 21 832

[51] Int. Cl.$^7$ .......................... C09J 133/14; C09J 163/10; C09J 167/06

[52] U.S. Cl. ................................ 525/27; 525/31; 525/44; 525/111; 525/112; 525/170; 525/263; 525/264; 525/303; 525/531; 526/227; 526/320

[58] Field of Search ..................................... 525/531, 936, 525/27, 31, 44, 111, 112, 170, 263, 264, 303; 526/227, 320

[56] References Cited

U.S. PATENT DOCUMENTS 4,426,243  1/1984  Briggs ...................................... 525/531
5,069,581  12/1991  Kistner ..................................... 525/531
5,098,973  3/1992  Kozuka .................................... 525/531
5,157,072  10/1992  Hense ...................................... 525/445

FOREIGN PATENT DOCUMENTS

| 0199671 | 10/1986 | European Pat. Off. . |
| 0150555 B1 | 9/1988 | European Pat. Off. . |
| 2381072 | 9/1978 | France . |
| 2505347 | 11/1982 | France . |
| 1205038 | 11/1965 | Germany . |
| 39 40 138 A1 | 6/1991 | Germany . |
| 45-15640 | 11/1966 | Japan . |
| 51-132687 | 5/1975 | Japan . |
| 59-159867 | 2/1983 | Japan . |
| 88/03599 | 5/1988 | WIPO . |

*Primary Examiner*—Patricia A. Short
*Attorney, Agent, or Firm*—Baker & Daniels

[57] ABSTRACT

The invention concerns a reagent kit designed to produce elements of synthetic resin for anchoring fixation elements in place by bonding them in multi-cavity plugs. The reagent kit comprises (a) a reagent mixture containing 2,2-bis-[4-(methacryloxyethoxy)phenyl]propane and an optionally unsaturated polyester resin, vinyl resin or acrylic resin or a mixture of these, (b) an accelerator component comprises an organic peroxide and (c) a filler component, the accelerator component (b) being kept separate from the reagent mixture (a) before use.

33 Claims, No Drawings

REAGENT KIT FOR THE PRODUCTION OF SYNTHETIC-RESIN ELEMENTS FOR BONDING FIXATION ELEMENTS IN PLACE IN AN ATTACHMENT SURFACE

The invention relates to a reagent kit for the production of synthetic resin bodies for anchoring of fixing elements in a fixing base, which can be used, in particular, in cartouches or destructible multi-cavity cartridges.

It has been known for a long time that curing synthetic resins can be employed for reliable fixing of anchor rods and the like in mature rock, masonry, concrete and the like.

In this procedure, the starting components of the synthetic resin and a suitable curing agent are introduced at the fixing sites separately from one another and are mixed there by driving in the fixing element. The formation of the synthetic resin body formed, which bonds the fixing element to the fixing base, is therefore started only when the fixing element is in its final position.

When reagent kits are used in so-called one-component cartouches, the curing agent for the synthetic resin is enclosed in capsules which can be destroyed by pressure and is mixed with the other constituents of the reagent kit, i.e. a curable synthetic resin and fillers, in the cartouche without the capsules being destroyed. The reagent kit is introduced into the prepared bore hole from the cartouche and the fixing element is then driven into the bore hole. During this operation, the capsules are destroyed and distribute the curing agent in the reaction mixture.

In the case of destructible multi-cavity cartridges, these are introduced into the bore hole and are destroyed by driving in the fixing elements, for example anchor rods. During this operation, the constituents are mixed with one another and the curing reaction of the synthetic resin is initiated.

The widespread use of this technique is due to its convenient application and easier storage, transportation and metering of the reactive starting materials of the synthetic resin body.

Cartridges which contain reaction mixtures for the preparation of cured synthetic resin bodies have already been described in DE-A-1,205,038 in connection with a method for fixing anchor rods without a strutting head in anchor support systems of pit rooms. These are glass or Bakelite cartridges into whose filling, which comprises curable polyester resin or epoxy resin [lacuna] a relatively large amount by weight of quartz sand or fine-ground quartz, a capsule containing the curing agent is introduced. organic peroxides are used as curing agents. If pre-accelerated epoxy resins are employed, an amine curing agent is used. The pre-accelerated epoxy resins cure slowly with amines, so that if a rapid load-carrying capacity of the fixing element is required, the glass cartouche and anchor rod have to be preheated to temperatures above 150° C. Peroxide-cured polyester resins are not sufficiently resistant to chemicals, and in particular are not resistant to alkalis. In the case of a basic fixing base in particular, this leads to a reduction in the mechanical properties of the plastic body in the long term. Moreover, polyester resins cured in this way also exhibit a relatively high absorbtion of water, which can also give rise to corrosion problems in connection with metallic fixing elements.

In order to eliminate the disadvantages of such known materials, EP-A-150,555 has proposed two-cavity cartridges in which the inner or outer cavity of a two-cavity cartridge built up from two glass cylinders inserted one into the other contains a fine-grained naturally occuring or synthetic mineral filler together with a vinyl ester epoxy resin based on acrylate or methacrylate, while the curing agent, an organic peroxide, is in the other respective cavity. The peculiarity of the cartridges according to EP-A-150,555 is that the resin components additionally comprise an ester of an epoxy resin with acrylic or methacrylic acid dissolved in a reactive monomer. However, the storage stability of the pre-accelerated vinyl ester epoxy resin has proved to be unsatisfactory.

The pre-accelerated resin components for such a reagent kit known from WO-88/03599 have a considerable [sic] longer storage stability. The storage stability is increased considerably by mixing 3 to 60 parts by weight of a vinyl ester epoxy resin, 63 to 3 parts by weight of an unsaturated polyester resin and 10 to 0.1 parts by weight of a conventional epoxy resin together with 28 to 45 parts by weight of one or more ethylenically unsaturated reactive monomers.

EP-A-199,671 describes the use of a curable acrylate for multi-cavity cartridges, which is obtained by reaction of acrylic acid derivatives with bisphenol compounds and/or novolak compounds containing epoxide groups dissolved in a reactive diluent, preferably styrene. The acrylate is, in particular, bisphenol A methyl methacrylate of the formula

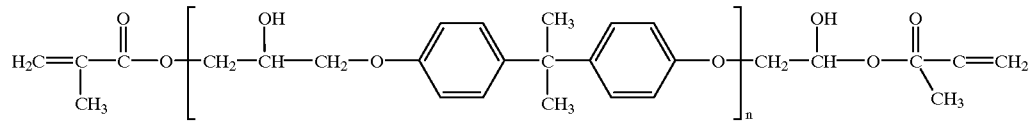

wherein n has values from 1 to 2.

DE-A-3,940,138 (A1) describes the use of cycloaliphatic compounds which are curable by polymerisation and are mono- or polysubstituted by ethylenically unsaturated radicals in or as plug compositions, which are distinguished by a low viscosity, extremely low volatility, extremely high boiling point, high flashpoint, low toxicity, and hydrophobicity and by a high compatibility with many polymers and resins. A lower intrinsic shrinkage and high hydrolytic stability of the cured composition, including under alkaline and acid conditions, is thereby achieved.

In spite of the improvement in properties in respect of the chemical resistance and low absorption of water, the known resins have a relatively large shrinkage in volume after curing.

The object of the present invention is to improve the known reagent kits further, in particular to provide synthetic resin bodies which have a low shrinkage in volume during curing and low absorption of water and at the the same have a good chemical resistance.

This object is achieved by a reagent kit for the production of synthetic resin bodies for anchoring fixing elements in a fixing base, the reagent kit comprising:

(a) a reaction mixture which comprises at least one ethylenically unsaturated monomer, (b) a curing agent component of an organic peroxide and (c) a filler component, the curing agent component (b) being separated from the reaction mixture (a) before use, characterised in that the reaction mixture in (a) comprises 51.0 to 100.00 parts by weight of monomeric 2,2-bis[4-(methacryloxyethoxy)phenyl]propane, and 49.0 to 0.0 parts by weight of unsaturated polyester resin, vinyl ester resin or acrylic resin or a mixture thereof.

The subclaims relate to preferred embodiments of the invention.

The reaction mixture (a) preferably comprises 75 to 99 parts by weight of the specific monomeric propane derivative, 25 to 1 parts by weight of the abovementioned polymer resins and 0.1 to 5.0 parts by weight of accelerating agent.

The total parts by weight of the reaction mixture preferably in each case give 100 parts by weight.

A particular advantage of an embodiment of the reaction mixture according to the invention is that, in addition to the specific monomeric propane derivative, it comprises no other reactive monomers. In particular, this reaction mixture according to the invention comprises no monomeric styrene, in contrast to many of the known reaction mixtures.

In another embodiment of the invention, the reaction mixture can also additionally comprise other reactive ethylenically unsaturated monomers.

In a further embodiment, the reaction mixture is pre-accelerated in order to obtain a rapid curing reaction on contact with the curing agent component. Accelerators which can be used are diethylaniline, dimethylaniline, N,N-dimethyltoluidines, 4,4-bis(dimethylamino) diphenylmethane, cobalt naphthenate, cobalt octoate or mixtures thereof. The reaction mixture (a) comprises 51.0 to 98.0 parts by weight of monomeric, 2,2-bis[4-(methacryloxyethoxy)phenyl]propane, 0.0 to 48.9 parts by weight of unsaturated polyester resin, vinyl ester resin or acrylic resin or a mixture thereof and 0.1 to 5.0 parts by weight of accelerating agent.

The reaction mixture according to the invention can additionally also comprise one or more liquid, non-reactive organic diluents, in order to bring the viscosity of the reaction mixture into the desired range and if appropriate also to modify the flexibility of the synthetic resin body formed on curing.

Suitable non-reactive organic diluents are acetone, dimethylformamide, toluene, methyl ethyl ketone (MEK), dibutyl phthalate, dimethyl phthalate, dihexyl phthalate or a mixture thereof.

In such a case, the pre-accelerated reaction mixture (a) comprises 51 to 99.9 parts by weight of specific monomeric propane derivative, 39 to 0.0 [lacuna] unsaturated polyester resin, vinyl ester resin or acrylic resin or a mixture thereof, 0.1 to 5.0 parts by weight of accelerating agent and 0 to 10 parts by weight of one or more liquid non-reactive organic diluent(s), based on the total weight of (a).

The reaction mixture preferably comprises up to 5 parts by weight of non-reactive diluent and correspondingly more monomer and/or unsaturated polyester resin, vinyl ester resin, acrylic resin or a mixture thereof.

The reaction mixture (a) can additionally comprise, although this is not preferred, further other reactive monomers, such as styrene, methyl methacrylate, ethyl methacrylate, α-methylstyrene, chlorostyrene, butyl acrylate, diallyl phthalate, trimethylolpropane trimethacrylate, dicyclopentenyloxylethyl [sic] methacrylate, 3,3,5-trimethylcyclohexyl methacrylate or benzyl methacrylate.

In such a case, the pre-accelerated reaction mixture (a) comprises 51 to 99.9 parts by weight of specific monomeric propane derivative, 24 to 0.0 parts by weight of unsaturated polyester resin, vinyl ester resin or acrylic resin or a mixture thereof, 0.1 to 5.0 parts by weight of accelerating agent and 25 to 0 parts by weight of one or more other reactive ethylenically unsaturated monomer(s), based on the total weight of (a).

It is in principle also possible for the reaction mixture to comprise both non-reactive diluent(s) and further other reactive monomer(s). In such an embodiment of the invention, the pre-accelerated reaction mixture (a) comprises 51 to 99.9 parts by weight of specific monomeric propane derivative, 24 to 0.0 parts by weight of unsaturated polyester resin, vinyl ester resin or acrylic resin or a mixture thereof, 0.1 to 5.0 parts by weight of accelerator, 10 to 0 parts by weight of non-reactive liquid organic diluent(s) and 15 to 0 parts by weight of one or more other ethylenically unsaturated monomers, based on the total weight of (a).

Suitable unsaturated polyester resins are unsaturated polyesters which are prepared on the basis of dibasic acids, such as maleic acid, o-phthalic acid and/or m-phthalic acid or isophthalic acid with a dihydric alcohol, such as ethylene glycol and/or propylene glycol. The unsaturated polyester resins cure or continue their polymerisation to give higher molecular weight solid polymers when they are brought into contact with a curing agent. The polyester resins usually comprise a diluent, which can be an ethylenically unsaturated monomer, such as styrene.

To prepare a particularly environment-friendly reaction mixture, unsaturated polyester resins which comprise no styrene are preferred. The ester number of the polyesters should preferably be in the range from 250 to 460 mg of KOH/g of polyester resin. The ester number is determined in accordance with DIN 53401.

Suitable vinyl ester resins are those which are obtained by reaction of polyepoxides with ethylenically unsaturated monocarboxylic acids. The known polyepoxides, such as glycidyl ethers of polyhydric alcohols and polyhydric phenols, epoxy-novolak and epoxidized unsaturated polyesters, can be used for the preparation of the vinyl ester resins as long as they contain more than one epoxide group per molecule. The polyepoxides can be monomers or polymers. Suitable unsaturated carboxylic acids for the reaction with polyepoxides are α, β-unsaturated monocarboxylic acids, such as acrylic acid, methacrylic acid and crotonic acid.

Particularly preferred polyepoxides for the reaction with ethylenically unsaturated monocarboxylic acids are bisphenol A epoxy resins, bisphenol F epoxy resins, novolak epoxy resins, epoxy resins of the halogenated bisphenol type, epoxy resins of the polyglycidyl ester type, such as diglycidyl phthalate, and epoxy resins of the polyglycidyl ether type, such as a glycidyl ether of an aliphatic alcohol. If appropriate, the secondary hydroxyl groups of the vinyl ester resins can be reacted with a dicarboxylic acid anhydride in order to form attached half-ester groups.

The preferred styrene-free vinyl ester resins or vinyl ester epoxy resins have an average molecular mass of 450 to 1200 daltons. The vinyl ester resins preferably have an ester number of 90 to 240 g of KOH/g of resin. The ester number is determined in accordance with DIN 53401, as already described. An acrylic resin which can be used is, for example, polymethyl methacrylate (PMMA), particle size 0.1 mm, if appropriate partly dissolved in methyl methacrylate.

The main component of the reaction mixture according to the invention is a bifunctional self-crosslinking monomer of the formula

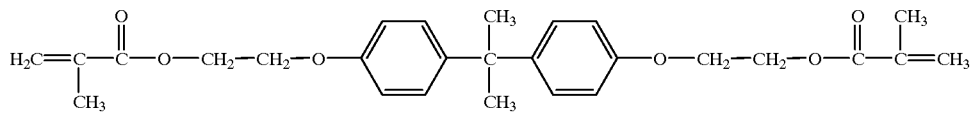

which imparts a surprisingly low shrinkage in volume of 1 to 2 percent to the resin body formed. However, the resin body also has an outstanding chemical resistance against the action of acids and bases and a low water absorption capacity. It also has a high heat resistance.

To achieve the low viscosity required for introduction of the curing agent component when used with multi-cavity cartridges or cartouches, the reaction mixture (a) preferably has a viscosity at 25° C. of 300 mPa.s to 10000 mPa.s.

Suitable peroxide curing agents are benzoyl peroxide, lauroyl peroxide, p-butyl hydroperoxide, p-butyl perbenzoate and methyl ethyl ketone peroxide.

Filler(s) is (are) added to the reaction mixture according to the invention as filler component(s). Preferred fillers are quartz sand, magnesium oxide, clinker, marble dust, calcium carbonate and glass beads. The particle size of the fillers is in the range from 0.001 to 5 mm.

In the case of multi-cavity cartridges which can be destroyed by pressure, the weight ratio of the total reagent kit is preferably 20 to 50 parts by weight of cartridge glass, 18 to 25 parts by weight of pre-accelerated reaction mixture 0.4 to 1.5 parts by weight of peroxide curing agent and 30 to 55 parts by weight of filler component.

In the case of cartouches with an encapsulated peroxide curing agent, the weight ratio of the total reagent kit is preferably (a) 35 to 50 parts by weight of pre-accelerated reaction mixture
1 to 8.0 parts by weight of thixotropic agent
50 to 65 parts by weight of filler component
1 to 8.0 parts by weight of encapsulated peroxide curing agent
0.5 to 4.0 parts by weight of thixotropic auxiliary (b) 35 to 50 parts by weight of reaction mixture
1 to 8.0 parts by weight of thixotropic agent
50 to 65 parts by weight of filler component
0.2 to 1.6 parts by weight of encapsulated amine accelerator
1 to 8.0 parts by weight of encapsulated peroxide curing agent
0.5 to 4.0 parts by weight of thixotropic auxiliary.

A suitable thixotropic agent is, for example, silicic acid (Aerosil 200).

Suitable thixotropic auxiliaries are, for example, polyhydroxycarboxamide solutions (Byk-R 605 from Byk-Chemie) and glycerol.

The low shrinkage in volume of the resin body produced with the reaction mixture according to the invention for adhesive anchoring of fixing elements becomes clear from the following comparisons.

Shrinkage in volume of the test specimens of the known reaction mixtures and from the reaction mixture according to the invention.

|   | Shrinkage in volume in % |
|---|---|
| 1. Unsaturated polyester resin, pre-accelerated by amine, with 30% by weight of styrene, viscosity at 23° C. 2300 mPa · s | 6.3 |
| 2. Vinyl ester resin, pre-accelerated by amine, with 38% by weight of styrene, viscosity at 23° C. 500 mPa · s | 7.8 |
| 3. Reaction mixture according to the invention, as in Example 1, viscosity at 23° C. 1500 mPa · s | 1.02 |

The invention will now be described in more detail with the aid of the following examples.

EXAMPLE 1

Cartridge of Size M12/Anchor Rod

Reaction mixture (a) 3.6 g of 2,2-bis[4-(methacryloxyethoxy)phenyl]propane are pre-accelerated with 0.03 part by weight of dimethyl-paratoluidines and mixed with 9.2 g of quartz sand (particle size 0.04 to 0.07 mm). 0.4 g of dibenzoyl peroxide (20 percent, inhibited in gypsum) is used as the curing agent component in the second cavity.

The multi-cavity cartridge comprises a total of 5.4 g of cartridge glass.

Anchor rod M 12×160, threaded rod quality 12.9

After a curing time of 0.5 hour at room temperature, the following strength values are determined in concrete:

Concrete: B25, actual strength 27 N/mm$^2$

Average extraction value 80 kN

Bond stress: 16.2 N/mm$^2$

Failure: bond fracture

EXAMPLE 2

Cartridge of Size M12/Anchor Rod 3.6 g of specific propane derivative as in Example 1 are formulated to a pre-accelerated reaction mixture with 8 parts by weight of vinyl ester, styrene-free, ester number =133 mg of KOH/g [lacuna] unsaturated polyester resin, styrene-free, ester number =360 mg of KOH/g and 0.04 g of dimethyl-paratoluidines.

9.2 g of quartz sand (average particle size 1.2 to 1.8 mm) are used as the filler component.

The other cavity of the two-cavity cartridge contains 0.25 g of dibenzoyl peroxide (50 percent, inhibited in N-phthalate [sic]). The total amount of cartridge glass is 5.4 g.

Anchor rod: M 12×160, threaded rod quality 9.8

After a curing time of 1 hour at room temperature, the following strength values are obtained:

Concrete: B25, actual strength 27 N/mm$^2$

Average extraction value 84 kN

Bond stress: 17 N/mm² (quality of the anchor rod)

Failure: anchor rod fracture

EXAMPLE 3

Cartridge of Size M12/Anchor Rod 3.6 g of specific monomeric propane derivative pre-accelerated as in Example 1 are formulated to a reaction mixture with 0.36 g of available unsaturated polyester, styrene-free, ester number =440 mg of KOH/g and 0.18 g of acetone, and the mixture is mixed with 9.0 g of quartz sand (particle size 1.2 to 1.8 mm) and introduced into the outer cavity of the cartridge.

The second cavity contains 0.35 g of dibenzoyl peroxide (30 percent, inhibited in inert filler and phthalate). The content of cartridge glass in the reagent kit is 5.4 g.
Anchor rod: M 12×160, threaded rod quality 9.8

After a curing time of 1 hour at room temperature, the following strength values are determined:

Concrete: B25, actual strength 27.4 N/mm²

Average starting value 84 kN

Bond stress: 17 N/mm²

Failure: bond fracture

EXAMPLE 4

2.6 g of specific propane derivative are formulated to a pre-accelerated reaction mixture with 0.72 g of vinyl ester, styrene-free, ester number =140 mg of KOH/g, 0.72 g of methyl methacrylate and 0.1 of N,N-dimethyl-p-toluidine.

9.0 g of quartz sand (particle size 1.2 to 1.8 mm) are used as the filler component.

The other cavity of the two-cavity cartridge contains 0.26 g of curing agent (50 percent by weight of benzoyl peroxide, inhibited in phthalate).

The content of cartridge glass in the reagent kit is 5.4 g.
Anchor rod: M 12×160, threaded rod quality 9.8

After a curing time of 0.5 hour at room temperature, the following strength values are determined:

Concrete: B 50

Average extraction value >81 kN

Bond stress: 16.4 N/mm²

Failure: steel fracture

EXAMPLE 5

3.4 g of specific propane derivative are formulated to a pre-accelerated reaction mixture with 0.21 g of plasticiser (phthalic acid polyester), 0.63 g of vinyl ester, styrene-free, ester number =109 mg of KOH/g and 0.02 g of N,N-dimethyl-p-toluidine.

9.0 g of quartz sand (particle size 1.2 to 1.8 mm) are used as the filler component.

The other cavity of the two-cavity cartridge contains 0.35 g of dibenzoyl peroxide (30 percent by weight, inhibited in inert filler and phthalate).

The content of cartridge glass in the reaction kit is 5.4 g.
Anchor rod: M 12×160, threaded rod quality 9.8

After a curing time of 0.5 hour at room temperature, the following strength values are determined:

Concrete: B 50

Average extraction value >85 kN

Bond stress: 17.2 N/mm²

Failure: steel fracture

EXAMPLE 6

2.59 g of specific propane derivative are formulated to a pre-accelerated reaction mixture with 0.63 g of styrene, 0.95 g of vinyl ester, ester number =109 mg of KOH/g, and 0.034 g of N,N-dimethyl-p-toluidine.

8.8 g of glass beads (particle size 0.6 to 2 mm) are used as the filler component.

The other cavity of the two-cavity cartridge contains 0.25 g of curing agent (50 percent by weight of benzoyl peroxide, inhibited in phthalate).

The content of cartridge glass in the reaction kit is 5.5 g.
Anchor rod: M 12×160, threaded rod quality 9.8

After a curing time of 20 minutes at room temperature, the following strength values are determined:

Concrete: B 50, actual strength 27.4 N/mm²

Average extraction value 84 kN

Bond stress: 17 N/mm²

Failure: bond fracture

EXAMPLE 7

3.35 g of specific propane derivative are formulated to a pre-accelerated reaction mixture with 0.2 g of polymethyl methacrylate (particle size 0.1 mm), 0.4 g of methyl methacrylate and 0.03g of N,N-dimethyl-p-toluidine.

9.9 g of quartz sand (particle size 1.2 to 1.8 mm) are used as the filler component.

The other cavity of the two-cavity cartridge contains 0.35 g of dibenzoyl peroxide (30 percent by weight, inhibited in inert filler and phthalate).

The content of cartridge glass in the reaction kit is 5.5 g.
Anchor rod: M 12×160, threaded rod quality 12.9.

After a curing time of 0.5 hour at room temperature, the following strength values are determined:

Concrete: B 50, actual strength 54.2 N/mm²

Average extraction value 99.9 kN

Bond stress: 20.4 N/mm²

Failure: bond fracture

EXAMPLE 8

73.4 g of specific propane derivative are mixed with 9.63 g of vinyl ester, ester number =133 mg of KOH/g, 4.62 g of plasticiser (phthalic acid polyester), 0.32 g of accelerator (N,N-dimethyl-p-toluidine), 4.4 g of thixotropic agent, 2.0 g of thixotropic auxiliary, 9.0 g of encapsulated curing agent (32 percent by weight of benzyl [sic] peroxide, inhibited in phthalate) and 96.0 g of quartz sand (particle size 0.1 to 0.5 mm) to give a uniform reactive resin mortar, and the mortar is introduced into a one-cavity cartouche.

The mixed composition is introduced into a bore hole of 14.3 mm diameter. An anchor rod M 12 with several tapers and a wire mesh sheath is inserted.

After a curing time of 0.5 hour at room temperature, the following strength values are determined:

Concrete: B 25, actual strength 25.8 N/mm²

Failure: anchor rod fracture

EXAMPLE 9

73.4 g of specific propane derivative are mixed with 9.63 g of vinyl ester, ester number =133 mg of KOH/g, 6.0 g of methyl acrylate, 0.38 g of encapsulated accelerator (70 percent by weight of diathylaniline [sic] and 30 percent by weight of dimethyl-p-toluidine), 6.0 g of thixotropic agent, 6.0 g of encapsulated curing agent (50 percent by weight of benzoyl peroxide, inhibited in phthalate) and 100.0 g of quartz sand (particle size 0.1 to 1.2 mm) to give a uniform reaction kit, and the kit is introduced into a polyamide hose (width 26 mm).

Cartridge weight: about 28 g

The cartridge is introduced into a bore hole of 17.0 mm diameter. A threaded anchor rod, size M 16, rotating on impact, is inserted.

After a curing time of 0.5 hour at room temperature, the following strength values are determined:

Concrete: B 50, actual strength 54.2 N/mm$^2$

Average extraction value: 84 kN

Failure: anchor rod fracture

We claim:

1. Reagent kit for the production of synthetic resin bodies for bonding and anchoring a fastening element in a fixing base, the reagent kit comprising a cartridge having a plurality of chambers, said chambers including:
   (a) a preaccelerated reaction mixture comprising from 51.0 to 100.00 parts by weight of monomeric 2,2-bis[4(methacryloxyethoxy)phenyl] propane and an accelerator;
   (b) a curing agent component of an organic peroxide; and
   (c) a filler component,
wherein the curing agent component (b) and the reaction mixture (a) are each contained in a respective said chamber prior to the use of said reagent kit.

2. The reagent kit according to claim 1, wherein the preaccelerated reaction mixture (a) further comprises up to 49.0 parts by weight of vinyl ester resin and less than 100 to 51.0 parts by weight of said monomeric 2,2-bis[4(methacryloxyethoxy)phenyl]propane, the total parts by weight of the reaction mixture (a) in each case totaling 100 parts by weight.

3. The reagent kit according to claim 2, wherein the preaccelerated reaction mixture (a) comprises 51 to 98.0 parts by weight of monomeric 2,2-bis[4(methacryloxyethoxy)phenyl]propane, up to 48.9 parts by weight of vinyl ester resin and 0.1 to 5.0 parts by weight of the accelerating agent.

4. The reagent kit according to claim 1, wherein the preaccelerated reaction mixture (a) further comprises up to 49.0 parts by weight of unsaturated polyester resin and less than 100 to 51.0 parts by weight of said monomeric 2,2-bis[4(methacryloxyethoxy)phenyl]propane, the total parts by weight of the reaction mixture (a) in each case totaling 100 parts by weight.

5. The reagent kit according to claim 4, wherein the preaccelerated reaction mixture (a) comprises 51 to 98.0 parts by weight of monomeric 2,2-bis[4(methacryloxyethoxy)phenyl]propane, up to 48.9 parts by weight of unsaturated polyester resin, and 0.1 to 5.0 parts by weight of the accelerating agent.

6. The reagent kit according to claim 1, wherein the preaccelerated reaction mixture (a) further comprises up to 49.0 parts by weight of acrylic resin and less than 100 to 51.0 parts by weight of said monomeric 2,2-bis[4(methacryloxyethoxy)phenyl]propane, the total parts by weight of the reaction mixture (a) in each case totaling 100 parts by weight.

7. The reagent kit according to claim 6, wherein the preaccelerated reaction mixture (a) comprises 51 to 98.0 parts by weight of monomeric 2,2-bis[4(methacryloxyethoxy)phenyl]propane, up to 48.9 parts by weight of acrylic resin and 0.1 to 5.0 parts by weight of the accelerating agent.

8. The reagent kit according to claim 1, wherein the preaccelerated reaction mixture (a) further comprises up to 49.0 parts by weight of a mixture of unsaturated polyester resin, vinyl ester resin or acrylic resin and less than 100 to 51.0 parts by weight of said monomeric 2,2-bis[4(methacryloxyethoxy)phenyl]propane, the total parts by weight of the reaction mixture (a) in each case totaling 100 parts by weight.

9. The reagent kit according to claim 8, wherein the preaccelerated reaction mixture (a) comprises 51 to 98.0 parts by weight of monomeric 2,2-bis[4(methacryloxyethoxy)phenyl]propane, up to 48.9 parts by weight of a mixture of at least two of unsaturated polyester resin, vinyl ester resin and acrylic resin and 0.1 to 5.0 parts by weight of the accelerating agent.

10. Reagent kit according to claim 1, wherein the preaccelerated reaction mixture (a) comprises 51 to 99.9 parts by weight monomeric 2,2-bis[4(methacryloxyethoxy)phenyl] propane, up to 39 parts by weight of unsaturated polyester resin, 0.1 to 5.0 parts by weight of accelerating agent and 0 to 10 parts by weight of one or more liquid non-reactive organic diluents.

11. Reagent kit according to claim 10, characterized in that the non-reactive organic diluent is acetone, dimethylformamide, toluene, MEK, dibutyl phthalate, dimethyl phthalate, dihexyl phthalate or a mixture thereof.

12. Reagent kit according to claim 1, wherein the preaccelerated reaction mixture (a) comprises 51 to 99.9 parts by weight monomeric 2,2-bis[4(methacryloxyethoxy)phenyl] propane, up to 39 parts by weight of vinyl ester resin, 0.1 to 5.0 parts by weight of accelerating agent and 0 to 10 parts by weight of one or more liquid non-reactive organic diluents.

13. Reagent kit according to claim 12, characterized in that the non-reactive organic diluent is acetone, dimethylformamide, toluene, MEK, dibutyl phthalate, dimethyl phthalate, dihexyl phthalate or a mixture thereof.

14. Reagent kit according to claim 1, wherein the preaccelerated reaction mixture (a) comprises 51 to 99.9 parts by weight monomeric 2,2-bis[4(methacryloxyethoxy)phenyl] propane, up to 39 parts by weight of acrylic resin, 0.1 to 5.0 parts by weight of accelerating agent and 0 to 10 parts by weight of one or more liquid non-reactive organic diluents.

15. Reagent kit according to claim 14, characterized in that the non-reactive organic diluent is acetone, dimethylformamide, toluene, MEK, dibutyl phthalate, dimethyl phthalate, dihexyl phthalate or a mixture thereof.

16. Reagent kit according to claim 1, wherein the preaccelerated reaction mixture (a) comprises 51 to 99.9 parts by weight monomeric 2,2-bis[4(methacryloxyethoxy)phenyl] propane, up to 39 parts by weight of a mixture of at least two of unsaturated polyester resin, vinylester resin, and acrylic resin and 0.1 to 5.0 parts by weight of accelerating agent and 0 to 10 parts by weight of one or more liquid non-reactive organic diluents.

17. Reagent kit according to claim 16, characterized in that the non-reactive organic diluent is acetone, dimethylformamide, toluene, MEK, dibutyl phthalate, dimethyl phthalate, dihexyl phthalate or a mixture thereof.

18. Reagent kit according to claim 1, wherein the reaction mixture (a) comprises 51 to 99.9 parts by weight of monomeric 2,2 bis[4(methacryloxyethoxy)phenyl]propane, 0.00 to 24 parts by weight of unsaturated polyester resin, 0.1 to 5.0 parts by weight of accelerating agent and 0 to 25 parts by weight of one or more other reactive ethylenically unsaturated monomers.

19. Reagent kit according to claim 18, wherein the other reactive monomers are styrene, methyl methacrylate, ethyl methacrylate, benzyl methacrylate or a mixture thereof.

20. Reagent kit according to claim 1, wherein the reaction mixture (a) comprises 51 to 99.9 parts by weight of monomeric 2,2 bis[4(methacryloxyethoxy)phenyl]propane, 0.0 to 24 parts by weight of vinyl ester resin, 0.1 to 5.0 parts by weight of accelerating agent and 0 to 25 parts by weight of one or more other reactive ethylenically unsaturated monomers.

21. Reagent kit according to claim 20, wherein the other reactive monomers are styrene, methyl methacrylate, ethyl methacrylate, benzyl methacrylate or a mixture thereof.

22. Reagent kit according to claim 1, wherein the reaction mixture (a) comprises 51 to 99.9 parts by weight of monomeric 2,2 bis[4(methacryloxyethoxy)phenyl]propane, 0.0 to 24 parts by weight of acrylic resin, 0.1 to 5.0 parts by weight of accelerating agent and 0 to 25 parts by weight of one or more other reactive ethylenically unsaturated monomers.

23. Reagent kit according to claim 22, wherein the other reactive monomers are styrene, methyl methacrylate, ethyl methacrylate, benzyl methacrylate or a mixture thereof.

24. Reagent kit according to claim 1, wherein the reaction mixture (a) comprises 51 to 99.9 parts by weight of monomeric 2,2 bis[4(methacryloxyethoxy)phenyl]propane, 0.0 to 24 parts by weight of a mixture of at least two of unsaturated polyester resin, vinyl ester resin and acrylic resin, 0.1 to 5.0 parts by weight of accelerating agent and 0 to 25 parts by weight of one or more other reactive ethylenically unsaturated monomers.

25. Reagent kit according to claim 24, wherein the other reactive monomers are styrene, methyl methacrylate, ethyl methacrylate, benzyl methacrylate or a mixture thereof.

26. Reagent kit according to claim 1, wherein the reaction mixture (a) comprises 51 to 99.9 parts by weight of monomeric 2,2 bis[4(methacryloxyethoxy)phenyl]propane, 0.0 to 24 parts by weight of unsaturated polyester resin, 0.1 to 5.0 parts by weight of accelerating agent, 0 to 10 parts by weight of non-reactive organic diluent and 0 to 15 parts by weight of one or more other reactive ethylenically unsaturated monomers.

27. Reagent kit according to claim 1, wherein the reaction mixture (a) comprises 51 to 99.9 parts by weight of monomeric 2,2 bis[4(methacryloxyethoxy)phenyl]propane, 24 to 0.0 parts by weight of vinyl ester resin, 0.1 to 5.0 parts by weight of accelerating agent, 0 to 10 parts by weight of non-reactive organic diluent and 0 to 15 parts by weight of one or more other reactive ethylenically unsaturated monomers.

28. Reagent kit according to claim 1, wherein the reaction mixture (a) comprises 51 to 99.9 parts by weight of monomeric 2,2 bis[4(methacryloxyethoxy)phenyl]propane, 24 to 0.0 parts by weight of acrylic resin, 0.1 to 5.0 parts by weight of accelerating agent, 0 to 10 parts by weight of non-reactive organic diluent and 0 to 15 parts by weight of one or more other reactive ethylenically unsaturated monomers.

29. Reagent kit according to claim 1, wherein the reaction mixture (a) comprises 51 to 99.9 parts by weight of monomeric 2,2 bis[4(methacryloxyethoxy)phenyl]propane, 24 to 0.0 parts by weight of a mixture of at least two of unsaturated polyester resin, vinyl ester resin and acrylic resin, 0.1 to 5.0 parts by weight of accelerating agent, 0 to 10 parts by weight of non-reactive organic diluent and 0 to 15 parts by weight of one or more other reactive ethylenically unsaturated monomers.

30. Reagent kit according to claim 1, wherein the reaction mixture (a) comprises 75 to 99.9 parts by weight of monomeric 2,2 bis[4(methacryloxyethoxy)phenyl]propane, 0.1 to 25 parts by weight of unsaturated polyester resin, and 0.1 to 5.0 parts by weight of accelerating agent.

31. Reagent kit according to claim 1, wherein the reaction mixture (a) comprises 75 to 99.9 parts by weight of monomeric 2,2 bis[4(methacryloxyethoxy)phenyl]propane, 0.1 to 25 parts by weight of vinyl ester resin, and 0.1 to 5.0 parts by weight of accelerating agent.

32. Reagent kit according to claim 1, wherein the reaction mixture (a) comprises 75 to 99.9 parts by weight of monomeric 2,2 bis[4(methacryloxyethoxy)phenyl]propane, 0.1 to 25 parts by weight of acrylic resin, and 0.1 to 5.0 parts by weight of accelerating agent.

33. Reagent kit according to claim 1, wherein the reaction mixture (a) comprises 75 to 99.9 parts by weight of monomeric 2,2 bis[4(methacryloxyethoxy)phenyl]propane, 0.1 to 25 parts by weight of a mixture of at least two of unsaturated polyester resin, vinyl ester resin and acrylic resin, and 0.1 to 5.0 parts by weight of accelerating agent.

* * * * *